July 3, 1945. O. EGERT 2,379,794

LOCK NUT

Filed Jan. 29, 1943

Inventor
Otto Egert
By Glascock Downing Seebe
Attys.

Patented July 3, 1945

2,379,794

UNITED STATES PATENT OFFICE 2,379,794

LOCK NUT

Otto Egert, London, England

Application January 29, 1943, Serial No. 473,995
In Great Britain January 27, 1942

5 Claims. (Cl. 151—20)

This invention relates to lock nuts and has for its object to provide an improved nut which avoids or reduces the necessity for lock nuts or spring washers or other locking devices, especially in cases where the nut is subjected to vibration and possibly severe vibration.

The invention in brief consists in a nut formed in or into a condition where it has a certain amount of twist resulting in relative movement in a longitudinal direction, which twist is wholly or in part taken up or employed to exert a pressure, for instance, on co-operating threads or a co-operating surface on the nut being tightened.

The invention also consists in nuts in accordance with the preceding paragraph formed with a longitudinal or other cut whether straight or curved or place of weakness in the side wall of the nut whether a face or an angle, in conjunction with which one or both of the end faces of the nut is formed at an angle to the longitudinal axis, for instance, as a surface of a helix or is stepped.

The invention also consists in a form of nut according to the preceding paragraph in which the modification of the end of the nut is replaced by a washer having a modified face, for instance, formed as a helical surface.

The invention also consists in improved nuts substantially as hereinafter described with reference to the accompanying drawing.

Referring to the accompanying diagrammatic drawing.

Figure 1:
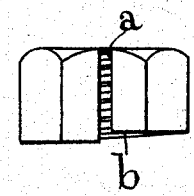
Figure 1 is an elevational view of one convenient construction of nut embodying the present invention.
Figure 2:
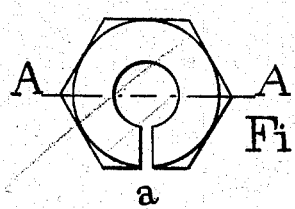
Figure 2 is a plan view thereof.
Figure 3:
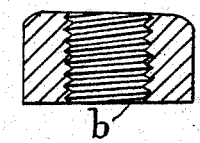
Figure 3 is a cross-sectional view on the line A—A thereof.

In carrying the invention into effect in one form illustrated by way of example in Figures 1-3, I take a standard nut, cut a small slot $a$ longitudinally completely through the side wall and modify the shape of the base $b$ of the nut so that instead of it being a plane surface it is in the form of the surface of a helix. The angle of the helix is such that the nut on tightening down tends to twist somewhat and exert such a pressure between co-operating threads or their surfaces that in effect it can replace an ordinary nut and spring washer, and indeed provides a very much stronger locking action than that provided by a nut and spring washer.

Figure 4:
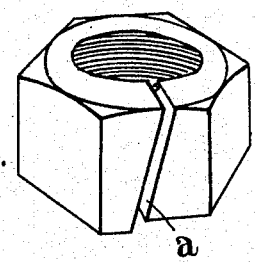
Figures 4, 5 and 6 are isometric views of further modified constructions.

In a modified form illustrated in Figure 4 the slot $a$ is inclined to the axis of the nut.

In the case of an inclined slot or curved slot the width of the slot should be sufficient to permit of the necessary degree of twist to be obtained.

Instead of the nut being entirely cut through by a longitudinal slot or the like the slot may be only partially cut through, leaving a bridge, but in order to give sufficient resiliency or twisting capacity the slot should extend through the wall of the nut otherwise than in the region of this bridge.

Figure 5:
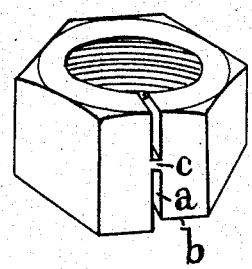

An example of such a construction is illustrated in Figure 5 in which a bridge $c$ is left at the centre of the cut $a$.

Figure 6:
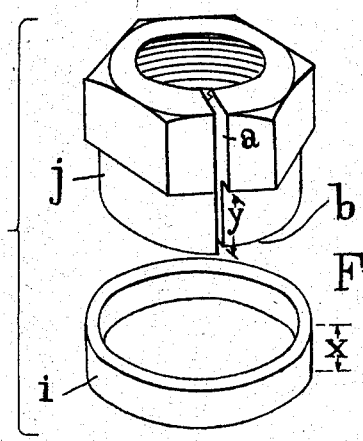

If desired a ring for strengthening may be applied around the nut to prevent the slot being too widely opened on tightening the nut, an example of such arrangement being illustrated in Figure 6. The depth $x$ of the ring $i$ should be less than minimum height $y$ of the circular boss $j$.

It is not essential that the lower face of the nut should be provided with a helical surface but some modification of a plane surface could be made so that in effect the parts of the base adjacent the slot are of somewhat different height. The slot need not be at right angles to the base, e. g. as in Figures 1-3 5 and 6, but may be inclined, e. g. as in Figure 4, or curved. Both ends of the nut may be modified instead of only one end but in all cases a normally threaded bore is employed and the structure of the finished nut is normal, that is to say, unbent.

I claim:

1. A nut comprising a body having a threaded bore and being slotted inwardly through one face whereby adjacent portions of the body may be relatively displaced in the direction of the axis of the bore, and step like means at the object engaging end of said body for effecting relative displacement of said portions as the body is advanced against an object along the thread of a bolt and thereby cause the body thread to firmly grip the bolt thread.

2. A nut as claimed in claim 1, wherein said means for effecting displacement is constituted by a stepped formation of the object engaging face of the body.

3. A nut as claimed in claim 1, wherein said means for effecting relative displacement is constituted by a helical configuration of the object engaging face of the body.

4. A nut as claimed in claim 1, characterized by the provision of a ring surrounding the body arranged to prevent expansion of the body but permit relative displacement of said portions.

5. A nut comprising a body having a threaded bore and slots extending partially through the body from the opposite faces thereof to weaken said body whereby adjacent portions thereof may be relatively displaced in the direction of the axis of the bore, and means for effecting relative displacement of said portions as the body is advanced against an object along the thread of a bolt and thereby cause the body thread to firmly grip the bolt thread.

OTTO EGERT.